L. N. TODD.
MARKING DEVICE FOR SEED PLANTERS.
APPLICATION FILED FEB. 2, 1910.
974,312.
Patented Nov. 1, 1910.
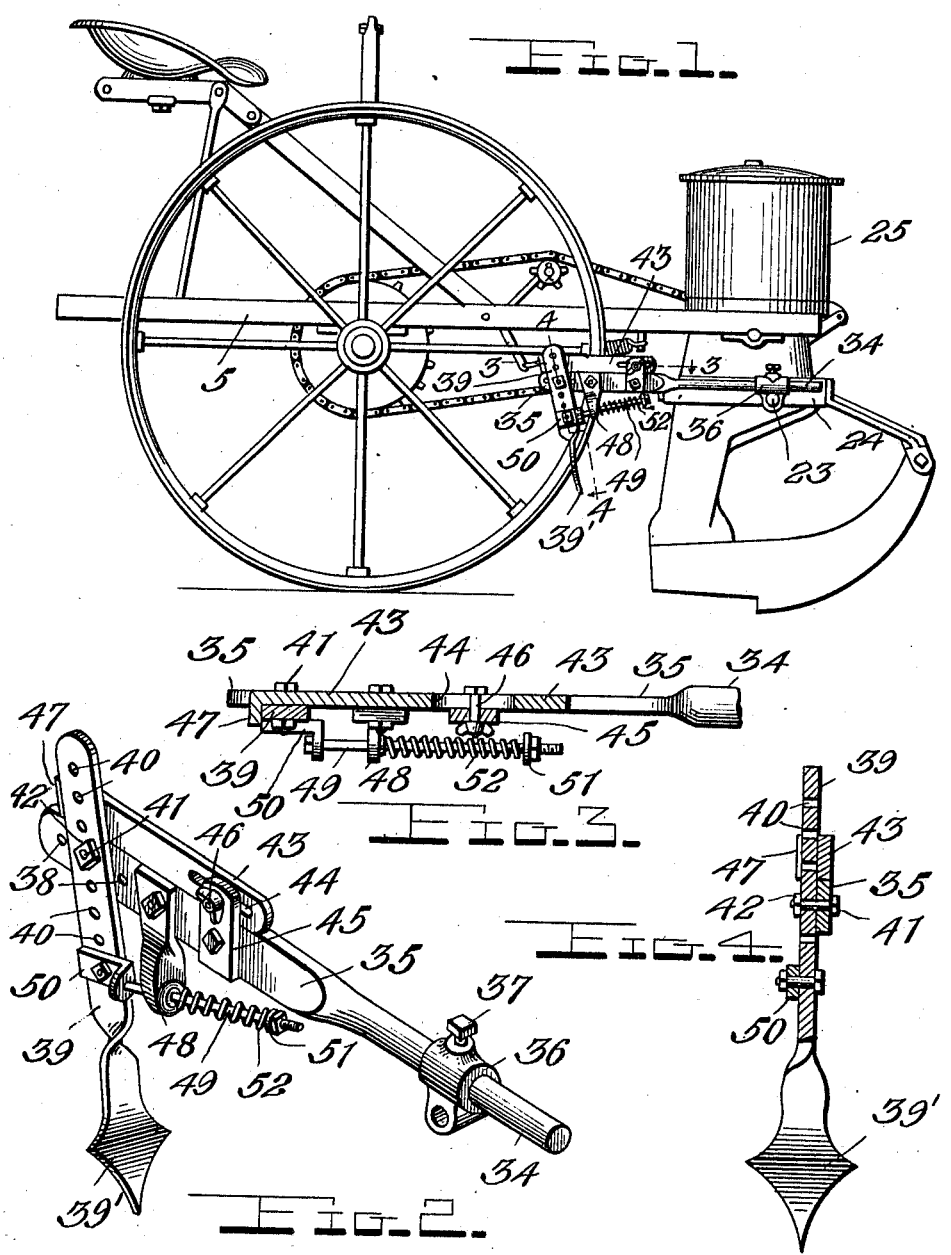
Witnesses
Chas. L. Griesbauer.
E. M. Ricketts
Inventor
L. N. Todd,
By Watson E. Coleman
Attorney

UNITED STATES PATENT OFFICE.

LUTHER N. TODD, OF CANTON, ILLINOIS.

MARKING DEVICE FOR SEED-PLANTERS.

974,312.  Specification of Letters Patent.  Patented Nov. 1, 1910.

Original application filed November 3, 1909, Serial No. 526,132. Divided and this application filed February 2, 1910. Serial No. 541,494.

*To all whom it may concern:*

Be it known that I, LUTHER N. TODD, a citizen of the United States, residing at Canton, in the county of Fulton and State of Illinois, have invented certain new and useful Improvements in Marking Devices for Seed-Planters, of which the following is a specification, reference being had to the accompanying drawings.

This invention relates to certain new and useful improvements in marking devices for seed planters and has for its object to provide a device of this character which is adapted to indicate the points at which the seed hills are deposited, said arms being automatically and simultaneously actuated with the seed dropping mechanism whereby the hills may be deposited in regular parallel rows.

A further object resides in the provision of an adjustable marking device carried upon each end of a rock shaft mounted in the machine frame, the marking foot being pivotally and yieldingly arranged upon the outer end of the arm and adapted to cushion the contact thereof with the ground and thus absorb the vibration.

A still further object is to provide a marking device of the above character of a very simple construction and one wherein the marking foot is arranged for easy and quick adjustment to accord with the various conditions of the ground.

With these and other objects in view, the invention consists of the novel features of construction and the combination and arrangement of parts hereinafter fully described and claimed, and illustrated in the accompanying drawings, in which—

Figure 1 is a side elevation of a planting machine provided with my improved marking device; Fig. 2 is an enlarged perspective view of the device removed; Fig. 3 is a section taken on the line 3—3 of Fig. 1; and Fig. 4 is a similar view taken on the line 4—4 of Fig. 1.

My invention is particularly devised with a view to its use in connection with seed planting machines of that character shown and described in my pending application for patent filed November 3, 1909, Serial Number 526,132. As therein shown a wheel supported main frame 5 is employed, and a second frame 24 is transversely arranged and supported beneath the forward end of said main frame. Upon this transverse frame adjacent to its ends the usual seed boxes 25 are arranged and have suitable mechanism arranged in connection therewith which is adapted to be automatically actuated from the wheel shaft of the machine whereby the seed will be simultaneously dropped in hills to deposit the same in parallel rows. A rock shaft 23 is mounted in the transverse frame 24 and extends beyond the opposite ends thereof. This shaft is rocked by the means for operating the seed dropping mechanism and in a manner specifically set forth in my application above referred to. It will, therefore, not be here set forth in detail as my present invention contemplates the use of various other means whereby the shaft may be rocked to operate the marking arms.

In order to provide means whereby the parallelism of these rows may be maintained after the machine has been turned, I provide the marking arms 34 upon the opposite ends of the rock shaft 23. These arms are shown in detail in Fig. 2 and each comprises a cylindrical shank having a rectangular portion 35. The cylindrical shank extends through a sleeve 36 in the form of a T-coupling, which is disposed upon the rock shaft and secured thereon by the set screw 37 against independent rotative movement. The rectangular or flattened portion of the shank is formed with a plurality of openings 38. A marking foot 39 is carried upon the arm and is adjustably mounted thereon. This marking foot is formed from a bar of metal bent to provide the right angular lower end 39'. The upper portion of the foot is provided with a plurality of apertures 40. Any one of these apertures is adapted to be brought into transverse alinement with any one of the apertures 38 in the marking arm and to receive therethrough a bolt 41 upon which a securing nut 42 is threaded. This securing nut, however, does not bind against the marking foot but allows of pivotal movement upon the end of the arm. A longitudinal bar 43 is disposed upon the flattened end portion of the arm and is provided at one end with an elongated slot 44. A plate 45 is also secured to the arm and carries a pin or stud 46 in one end which is disposed through the slot and has a head formed thereon to retain the bar 43 in position. The other end of this bar is extended at a right angle, as at 47, and is disposed upon the rear edge of the marking foot 39 to limit its pivotal movement in one direction. In order to cushion the contact of the lower end of the foot with the ground, a hanger 48 is secured to the marking arm and a rod 49 is movable therethrough and is secured at one end to a bracket plate 50 which is secured to the foot 39. The free end of this rod has engaged thereon a nut 51 and a spring 52 is coiled about the rod and has its ends engaged against a washer and the lower end of the hanger 48. Thus, as the marking foot contacts with the ground the shock which is imparted to the arm is absorbed to a large extent by the spring 52, thus obviating the liability of derangement of the various parts.

From the foregoing it will be seen that I have provided a marking device for corn or other seed planters which is of comparatively simple construction and one which is practically indestructible in operation. The marking foot is permitted to have a certain degree of pivotal movement upon the marking arm, thus obviating the liability of breaking the lower end of the foot as it is drawn over the ground after contacting therewith in the forward movement of the machine. By simply loosening the nut on the stud 46, the bar 43 may be readily adjusted upon the end of the marking arm to allow of a greater or less extent of such pivotal movement as may be found most desirable under different conditions.

While I have specifically shown and described what I believe to be the preferable embodiment of the invention, I would have it understood that the same is susceptible of a great many minor modifications without materially departing from the essential features or sacrificing any of the advantages of the same.

Having thus described the invention what is claimed is:

1. In a device of the character described, a shank, a bar longitudinally movable thereon, a marking foot pivotally secured to said shank, the end of said bar being engaged with the rearward edge of said foot to limit its pivotal movement in one direction and means for cushioning the contact of the foot with the ground.

2. A device of the character described comprising a shank, a longitudinally adjustable bar carried by said shank, a marking foot pivotally secured on the rear end of the shank, the rear end of said bar being engaged over the edge of said foot, means for adjusting said marking foot upon the shank, a hanger depending from the shank and means carried by the marking foot movably engaged with said hanger for cushioning the contact of the foot with the ground.

3. A device of the character described comprising a shank, a marking foot pivotally secured to the rear end of said shank, a longitudinally movable bar adjustably arranged upon said shank and having its rear end engaged over the edge of the marking foot, means for securing the bar in its adjusted position, means for adjusting the marking foot on the shank, a hanger secured to the shank and means carried by the marking foot movably engaged with the hanger for cushioning the contact of the foot with the ground.

4. A device of the character described comprising a shank, a bar movably arranged upon the rear end of said shank, means for securing said bar against movement, a marking foot pivotally secured on the rear end of the shank, the extremity of said bar being engaged over the edge of the marking foot, a hanger secured to the shank, a rearwardly extending rod carried by the marking foot and movable in said hanger and means arranged on said rod to cushion the impact of the foot with the ground.

5. A device of the character described comprising a cylindrical shank having a flattened rear portion, a bar having a slot in one end movably mounted on said shank, a plate carried by said shank having a set screw disposed through the slot in said bar and adapted to secure the same in its adjusted position, a marking foot pivotally secured to the rear end of said shank, said shank and marking foot having a longitudinal series of openings adapted to be registered, a pivot bolt extending through the alined openings having a nut engaged upon its ends, whereby said marking foot may be adjusted upon the shank, a hanger secured to the shank, a rearwardly extending rod carried by the marking foot movable in said hanger, a nut engaged upon the extremity of said rod, and a spring arranged upon said rod between the nut and the hanger adapted to cushion the impact of the foot with the ground.

6. In a device of the character described, the combination with a wheeled frame, of a rock shaft transversely mounted therein, means for actuating said rock shaft, a marking arm adjustably mounted in a sleeve on each end of said shaft, a marking foot pivotally carried on the rear end of said arm, means for limiting the pivotal movement of said foot and means for cushioning the contact of the foot with the ground.

7. In a device of the character described, the combination with a wheeled frame, of a transversely arranged rock shaft journaled therein, a marking arm longitudinally adjustable in a sleeve secured on each end of said shaft, a marking foot carried on the rear end of said shaft and disposed at an angle thereto, said foot being vertically adjustable and pivotally mounted, a plate carried by said arm engaged with said marking foot and adapted to limit its pivotal movement, and means for cushioning the impact of the foot with the ground.

8. In a device of the character described, the combination with a wheeled frame, of a rock shaft transversely arranged in the forward end of said frame, a marking arm longitudinally adjustable in sleeves secured to each end of said shaft, the outer end of each of said arms being flattened and provided with a plurality of openings therein, a marking foot disposed on said arm at an angle thereto and having a vertical series of openings adapted to be brought into alinement with the openings in the foot, a bolt extending therethrough having a nut on one end to pivotally secure the foot to the arm, a plate carried by said arm having limited longitudinal movement thereon, the rear end of said plate being engaged with the foot to limit its pivotal movement, a rod secured to said foot extending rearwardly thereof, a hanger secured to the foot, said rod being movably disposed therethrough, and a spring arranged upon said rod between its outer end and the hanger adapted to cushion the impact of the foot with the ground.

9. In a device of the character described, the combination with a wheeled frame, of a transversely arranged rock shaft journaled in said frame, an adjustable marking arm disposed through a sleeve secured to each end of said shaft, a marking foot pivoted on the outer end of said arm and vertically adjustable, a plate longitudinally movable upon said arm engaged at one end with said foot to limit its pivotal movement, a bracket plate secured to said foot, a rod secured to said plate and extending rearwardly thereof, a hanger secured to the arm having an aperture in its lower end, said rod being disposed therethrough, and a spiral spring disposed about said rod between a washer carried on the outer end thereof and said hanger to cushion the impact of the foot with the ground.

In testimony whereof I hereunto affix my signature in the presence of two witnesses.

LUTHER N. TODD.

Witnesses:
H. C. MORAN,
C. E. WEED.